Jan. 23, 1962 C. W. BAUGH, JR 3,018,325

TELEVISION AUTOMATIC FREQUENCY CONTROL APPARATUS

Filed March 20, 1958 2 Sheets-Sheet 1

WITNESSES:

Bernard R. Giegucy

Robert C Baird

INVENTOR
Charles W. Baugh, Jr.
BY
Benjamin DeWitt
ATTORNEY

United States Patent Office 3,018,325
Patented Jan. 23, 1962

3,018,325
TELEVISION AUTOMATIC FREQUENCY CONTROL APPARATUS

Charles W. Baugh, Jr., Montgomery Township, Mercer County, N.J., assignor to Westinghouse Electric Corporation, East Pittsburgh, Pa., a corporation of Pennsylvania Filed Mar. 20, 1958, Ser. No. 722,735
4 Claims. (Cl. 178—5.8)

This invention relates generally to television receivers and, more particularly, to automatic frequency control circuits for them.

In standard television systems, it is the practice to transmit the picture signals on one carrier wave and to transmit complementary sound signals on an adjacent carrier wave.

In a television receiver of the type utilizing the intercarrier sound system, the picture and sound intermediate frequency signal are amplified in the same amplifier and an intercarrier sound signal is derived by heterodyning the picture and sound intermediate frequency signals. The intercarrier sound frequency corresponds to the difference between the picture and sound carrier frequencies and in standard television systems is 4.5 megacycles.

It has been the practice in the design of a television receiver of the intercarrier sound type to employ some sort of attenuation circuit to control the sound signal level relative to the picture signal level. The attenuation circuit, although helping to shape the overall picture intermediate frequency response curve, is essentially provided to prevent beats in the second detector between the sound signal and high frequency components of the video signal in a monochrome television receiver. In a single second detector type of color television receiver, an even greater attenuation is usually required at the accompanying sound carrier frequency to prevent beats between the color components and the sound signal.

It is highly desirable that the frequency of the local oscillator in both monochrome and color television receivers be controlled in order to control the frequency of the intermediate sound signal to effect adequate attenuation to the accompanying sound carrier by the attenuation circuit.

In the copending application Serial No. 660,870, filed May 22, 1957, entitled "Automatic Frequency Control System for Television Receiver," now Patent No. 2,916,-545 by Charles W. Baugh, Jr., there has been described an automatic frequency control system for an intercarrier type television receiver by means of which the frequency of the local oscillator is controlled. In accordance with the principles set forth in said copending application use is made of the intercarrier sound signal and the direct current component developed at the second detector to effect control of the frequency of the local oscillator. In particular, in said copending application, use is made of a first control signal which is a function of the level or amplitude of the intercarrier sound signal and a second control signal which is a function of the direct current component or average direct current voltage developed at the second detector to effect control of the frequency of the local oscillator. Under conditions where the intermediate frequency picture signal is the stronger at the second detector, both the first and second control signals are utilized. And, under conditions where the intermediate frequency sound signal is the stronger at the second detector and intercarrier sound signal is not developed, the second control signal is utilized for this purpose. The second control signal at this time will be markedly different in value due to the change in level of the direct component developed at the second detector by reason of the fact that the signal detected at this time is a frequency modulated one rather than an amplitude modulated one.

In accordance with the present invention, an automatic frequency control circuit is provided which acts as an amplifier for the intercarrier sound signal under conditions of normal tuning of the television receiver and which also acts as a direct current control under conditions where the intermediate frequency sound signal is the stronger signal at the second detector.

It is, accordingly, an object of the present invention to provide an improved automatic frequency control circuit for an intercarrier type television receiver.

It is another object of the present invention to provide an automatic frequency control circuit for an intercarrier type television receiver which acts as an amplifier for the intercarrier sound signal under conditions of normal tuning of the receiver and acts as a direct current control under conditions where the intermediate frequency sound signal is the stronger signal at the second detector.

It is still another object of the present invention to provide an automatic frequency control circuit for an intercarrier type television receiver which acts as an amplifier for the intercarrier sound signal at one phase of tuning of the receiver and acts as a direct current control at another phase of tuning of the receiver.

It is a further object of the present invention to provide an automatic frequency control circuit for an intercarrier type television receiver in which an electron discharge device is utilized to amplify the intercarrier sound signal and to provide direct current control from the second detector.

It is still a further object of the present invention to provide an automatic frequency control circuit for an intercarrier type television receiver for amplifying the intercarrier sound signal and for dynamically limiting the intercarrier sound signal before frequency modulation detection.

It is a still further object of the present invention to provide an automatic frequency control circuit for an intercarrier type television carrier providing wide pull-in range for the local oscillator of the receiver.

These and other objects are directed to the invention as will be apparent from the following description taken in accordance with the accompanying drawings throughout which like reference characters indicate like parts, and in which.

Figure 1:
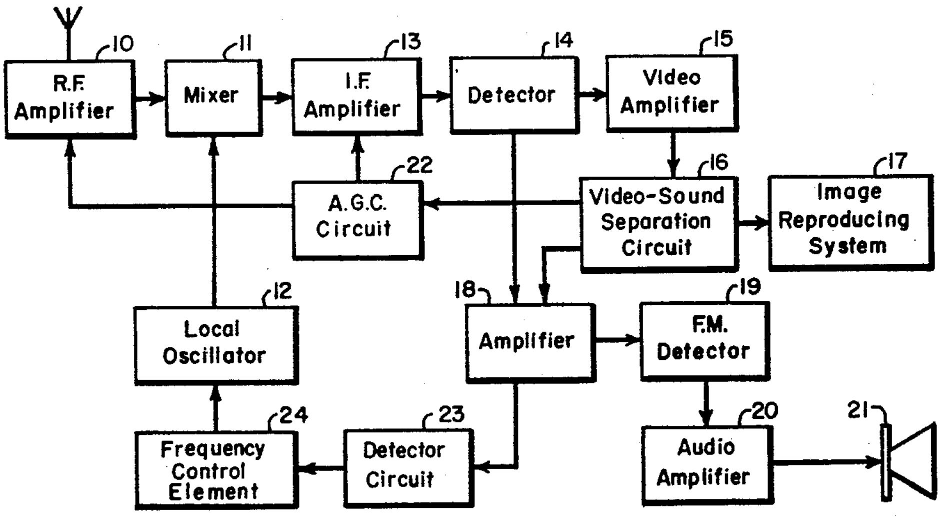
FIGURE 1 is a block diagram of the television receiver including an automatic frequency control circuit in accordance with the invention.

The television receiver illustrated in FIG. 1 includes a radio frequency amplifier 10 which supplies both the sound and picture radio frequency signals to a mixer 11. In accordance with present day standards, these carriers are separated by 4.5 megacycles. The output of a tunable local oscillator 12 is supplied to the mixer or first detector 11 and the beat frequencies provided by the heterodyning action within the mixer 11 includes the picture intermediate frequency carrier and sound intermediate frequency carrier. The picture and sound intermediate frequencies are applied to a common intermediate frequency amplifier 13, wherein signals within a predetermined frequency range defined by the pass band of the intermediate amplifier are amplified. The intermediate frequency amplifier 13 has a desired frequency response characteristic. The level of the intercarrier sound signal which is produced in the second detector of the receiver is a function of the positions of the intermediate frequnecy video and sound modulated waves with respect to the desired frequency response characteristic. The level of the intercarrier sound signal will change whenever the intermediate frequency video and sound waves depart from predetermined positions with respect to the intermediate frequency amplifiers desired response characteristic.

The picture and sound intermediate frequencies from the intermediate frequency amplifier 13 are applied to a second detector 14 wherein the picture signals are derived from the picture intermediate frequency and the picture and sound intermediate frequency waves are heterodyned to produce an intercarrier sound signal. The video or picture wave and the intercarrier sound wave are applied to video amplifier 15. After amplification in the video amplifier 15 the video and intercarrier sound signals are applied to a video-sound separation circuit 16 which separates the video and intercarrier sound signals. The video signals are applied to suitable image reproducing system 17.

The intercarrier sound signal in the video-sound separation circuit 16 is applied to an amplifier 18 in the sound channel of the receiver. The sound channel may comprise a frequency modulation detector 19 and an audio amplifier 20. The output of the audio amplifier 20 is connected to a suitable sound-reproducing device 21.

The output from the video-sound separation circuit 16 is also applied to an automatic gain control circuit 22 of the "peak detection type" which acts in a well-known manner to control the amplification of the stages comprising the radio frequency amplifier 10 and the intermediate amplifier 13 in accordance with the intensities of received television signals.

A detector or rectifier circuit 23 which may be included as a part of the frequency modulation detector 19 is connected to the amplifier 18 and to a frequency control element 24. The output of the detector circuit 23 is applied to the frequency control element 24 which, in turn, controls the frequency of the local oscillator 12. The frequency control element 24 may comprise a diode which, in series with a condensor, is connected across the tank circuit of the local oscillator 12, shunting a variable reactance across the tank circuit and hence changing the frequency of the local oscillator. This variation of reactance is accomplished by varying the effective load applied to the diode to control its conduction. The amount of reactance applied across the tank circuit of the local oscillator 12 is determined by the loading applied to the frequency control element 24. This loading is governed by the developed voltage of the circuit comprising the amplifier 18 and the detector circuit 23. As the reactance across the tank circuit of the local oscillator 12 is varied, the oscillator frequency is varied. If the capacitive reactance is increased, the frequency of the oscillator 12 will be increased and vice versa.

Figure 2:
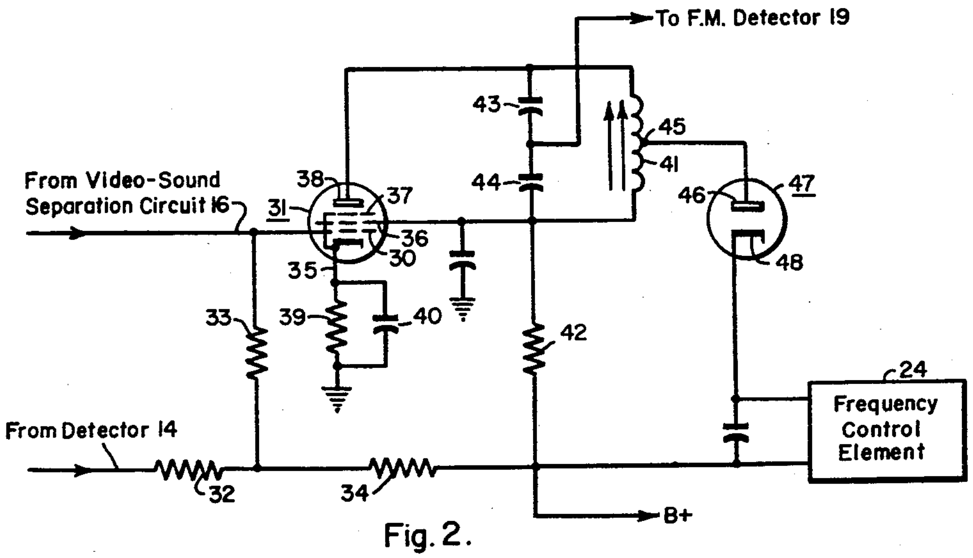
FIG. 2 is a circuit diagram in schematic form of an automatic frequency control circuit in accordance with the invention.

In accordance with the present invention, a signal which is a function of the direct current component developed at the second detector 14 is supplied to the amplifier 18. In FIG. 2 there is shown a schematic representation of the circuit comprising the amplifier 18 and the detector circuit 23 of FIG. 1.

Referring to FIG. 2 in detail, the intercarrier sound signal from the video-sound separation circuit 16 is coupled to the control grid 30 of an electron discharge device 31. The direct current voltage developed at second detector 14 is also coupled through resistors 32 and 33 to the control 30 of the device 31. From the junctions of resistors 32 and 33 a connection is made through a resistor 34 to a source of positive potential represented as B+, and to one terminal of the frequency control element 24.

Electron discharge device 31 also has a cathode 35, a screen grid 36, a suppressor 37 and a plate 38. The cathode 35 is connected to ground potential through a resistor 39 shunted by a capacitor 40. The suppressor electrode 37 is connected to the cathode 35. The plate 38 is connected through an inductor 41 with an adjustable core and a resistor 42 to the source of operating potential B+. A pair of capacitors 43 and 44 are connected across the inductor 41, and from a point between them a connection is made to the frequency modulation detector 19. From a tap 45 on the inductor 41 a connection is made to the plate 46 of a diode 47. The diode 47 has a cathode 48 which is connected to another terminal of the frequency control element 24.

Figure 3:
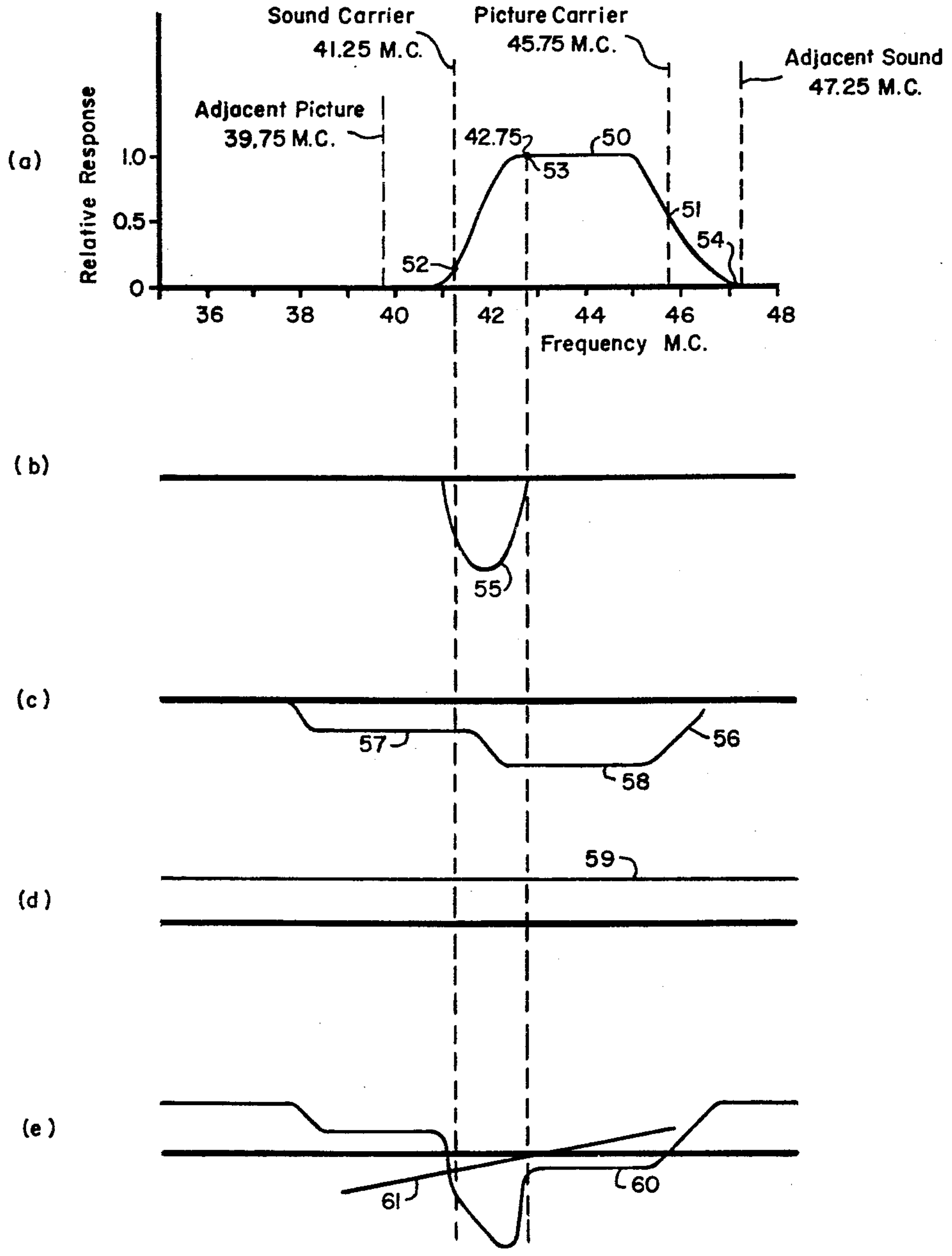
FIG. 3 shows a plurality of curves used in explaining the operation of the invention.

FIG. 3 shows a frequency response characteristic for the intermediate frequency amplifier 13 of FIG. 1. The intermediate frequency amplifier 13 has a frequency response characteristic indicated by the curve 50. On curve 50, point 51 represents the video carrier frequency, which is approximately six decibels below the maximum level, and point 52 represents the center frequency of the sound signals which is attenuated approximately 36 decibels below the maximum level. The amplitude of the intercarrier sound signal is largely determined by the amplitude of the smaller of the two intermediate frequency carriers. The frequency response characteristic of the intermediate frequency amplifier 13 has a steep slope in the vicinity of the intermediate frequency sound carrier produced by a suitable attenuation circuit or trap. In FIG. 3(*b*), curve 55 represents the control signal produced by rectification of the intercarrier sound signal in the detector circuit 23. The amplitude of this control signal varies in accordance with the amplitude in the intercarrier sound signal. In FIG. 3(*c*), curve 56 represents the average direct current component at the output of second detector 14. With the intermediate frequency video and sound signals located at the points 51 and 52, respectively, on curve 50 of FIG. 3(*a*), the level of this direct current component will correspond to the level at the point 57, for example. The automatic gain control circuit 22 will operate to hold the peak value of the video signal output of second detector 14 substantially constant. With the intermediate frequency sound and video signals located at points 53 and 54, respectively, on curve 50, the level of this direct current component will correspond to the level at point 58, for example. In FIG. 3(*d*), curve 59 represents bias voltage applied to the automatic frequency control circuit to set the proper operating level. In FIG. 3(*e*), curve 60 represents the response of the automatic frequency control system and curve 61 represents a suitable control characteristic for the local oscillator 12.

The operation of the automatic frequency control circuit will now be explained. When no signal is being received by the television receiver (the tuner being completely off an active channel), a small positive bias, as represented in FIG. 3(*d*), exists on the control grid 30 of the electron discharge device 31 causing the device to conduct heavily. A large voltage drop will occur across the load resistor 42. Across the terminals of the frequency control element 24 there will be present a voltage equal to the voltage across the resistor 42. This is due to the rectification of the voltage of the local oscillator 12. Thus, the diode 47 will have zero potential across it and will not be conducting. At this time, the diode 47 is effectively an open circuit across the frequency control element 24. The local oscillator 12 is initially adjusted so that it is tuned slightly high in frequency and so it remains at this frequency. The reason the local oscillator 12 is tuned high in frequency will become clear as this description continues.

When an active television channel is selected, the received television signals are converted in the mixer 11 to intermediate frequencies. Since the frequency of the local oscillator 12 is tuned high, the intermediate frequency sound carrier at approximately 42.75 megacycles will be located at a position, such as at 53, which is high up on the response characteristic of the intermediate frequency amplifier 13 and the intermediate frequency carrier at 47.25 megacycles will be at a position such as at 54. The intermediate frequency picture carrier, because of its position on the response characteristic of the intermediate frequency amplifier 13 is so greatly attenuated that no beat betwen the intermediate frequency picture and sound carriers occurs at the second detector 14. At this time no video signals or intercarrier sound signal will be developed. However, the intermediate frequency sound carrier is located at a position high on the response characteristic and it is a frequency modulated one. The amplitude of the intermediate frequency sound signal will cause a substantial increase in the direct current voltage developed at the second detector 14 as shown in FIG. 3(*c*). This direct current voltage which is of negative polarity causes the voltage on the control grid 30 of the electron discharge device 31 to go in a negative direction causing the device 31 to cut off. At this time, the device 31 is acting as a direct current amplifier. With the device 31 cut off, only a small voltage drop is developed across the resistor 42. The diode 47 will now have a positive voltage applied to its plate 46 equal to the difference between the voltage appearing across the terminal of the frequency control element 24 and the voltage across the resistor 42. Since the diode 47 is now biased in the forward direction, it will conduct causing current to flow from the negative terminal of the frequency control element 24 through the diode 47, inductor 41 and the resistor 42 back to its positive terminal. This flow of control current lowers the effective resistance across the terminal of the frequency control element 24 thereby lowering the frequency of the local oscillator 12. As the electron discharge device 31 is connected to act as a direct current control when the intermediate frequency sound signal is the strong signal at the second detector 14, a safe maximum loading of the local oscillator 12 is assured.

With the frequency of the local oscillator 12 lowered, the intermediate frequency sound carrier is caused to move down the response characteristic of the intermediate frequency amplifier 13 and the intermediate frequency picture carrier is caused to move up on this response characteristic. The amplitude of the intermediate frequency sound signal will decrease and the amplitude of the intermediate frequency picture signal will increase. At the second detector 14, the picture signal is detected and the intercarrier sound signal is developed. The average direct current voltage at the second detector 14 will decrease to the level 57 as shown in FIG. 3(*c*).

The change in level of the direct current voltage produced by detector 14 occurs when the frequency of IF sound carrier shifts from point 53 toward point 52. This voltage change is caused by the action of the peak acting AGC circuit 22 substantially as follows. The IF sound signal is of constant amplitude, hence its average alternating current amplitude is equal to its maximum alternating current amplitude. In contrast, the IF picture carrier, which is amplitude modulated with picture information, has a "blacker-than-black" peak having an amplitude considerably greater than its average carrier amplitude. Specifically, on an all-black picture the average picture signal amplitude is approximately 75% of its peak amplitude. Similarly, for a typical picture the average picture signal amplitude is approxmately one-half or 50% of the peak amplitude. Thus the amplitude detected picture signal has a peak value to average value ratio of approximately 2:1, while the detected IF sound signal has a peak value to average value ratio of 1:1. When the sound carrier is at point 53 (42.75 mc.), it will have a greater amplitude than the picture carrier and accordingly the AGC circuit will respond to the sound carrier to maintain a constant output from detector 14, the level of which is indicated by portion 58 of FIG. 3(*c*).

Similarly, when the sound carrier is near point 52 (41.25 mc.), it will be appreciably attenuated, while the picture carrier will be within the IF passband and will be amplified. The picture signal will have a much greater amplitude than the sound signal and accordingly, the AGC circuit will respond to the peak values of the picture signal to maintain those peak values at a level substantially equal to the level indicated by point 58. With the peak amplitude of the picture signal held at the level of point 58 and with the picture signal having a peak to average ratio of approximately 2:1, the average direct current voltage applied to amplifier device 31 from detector 14 will be substantially as indicated by portion 57 of FIG. 3*c*. The decrease in average direct current voltage output at detector 14 from level 58 to level 57 is sufficient to unbias discharge device 31 so that it is permitted to conduct when the sound carrier and picture carrier are respectively in the vicinity of points 52 and 51 of FIG. 3*a*.

The intercarrier sound signal developed at second detector 14 is amplified in the video amplifier 15 and the electron discharge device 31 and then coupled to the diode 47 wherein it is rectified. The rectification of the intercarrier sound signal produces a flow of direct current in the frequency control element 24, the magnitude of which is a function of the amplitude of the intercarrier sound signal. The effective resistance across the frequency control element 24 is lowered further decreasing the frequency of the local oscillator 12. FIG. 3(*b*) shows the direct current control signal developed by reason of the rectification of the intercarrier sound signal.

The frequency of the local oscillator 12 will continue to be decreased until the intermediate frequency picture and sound carriers are at the desired positions, such as at 51 and 52 respectively in FIG. 3(*a*). When the local oscillator 12 is at correct frequency, the control current developed by the automatic frequency control circuit is a function of the amplitude of the intercarrier sound signal and the average direct current developed at second detector 14. This current represents the difference between the actual frequency and the correct frequency for the local oscillator 12. In response to the error signal the frequency control element 24 or reactance circuit develops sufficient capacitive reactance to maintain the frequency of the local oscillator 12 within the desired range of permissible 'locked-in' frequency deviation.

If the local oscillator 12 should drift high in frequency, the intercarrier sound signal would increase in amplitude and a greater current would be developed through the frequency control element 24. This greater current would lower the frequency of the local oscillator 12. If the local oscillator 12 should drift low in frequency, the intercarrier sound signal would decrease in amplitude and a lesser current would be developed through the frequency control element 24. This lesser current would tend to increase the frequency of the local oscillator 12.

It is seen from the above that the automatic frequency control circuit described provides gain for the intercarrier sound signal, dynamically limits the intercarrier sound signal prior to frequency modulation detection and provides a wide pull-in range for the local oscillator. Also, the circuit allows a safe maximum loading of the local oscillator when a high direct current voltage is developed at second detector due to the intermediate frequency sound signal being the strong signal at the second detector.

While the invention has been shown in a preferred form, numerous modifications falling within the spirit and scope of the invention will be readily apparent to those skilled in the art after the benefit of the above description has been obtained.

I claim as my invention:

1. An intercarrier sound television receiver for utilizing a picture carrier of a first frequency amplitude modulated with video information and an associated sound carrier of a second frequency having a predetermined relation to said first frequency and frequency modulated with sound information, said receiver comprising: a first detector means including a tunable local oscillator for developing a separate intermediate frequency for each of said carriers; an intermediate frequency circuit means coupled to said first detector means of sufficient bandpass to transmit said two intermediate frequency carriers and having a response characteristic so as to transmit said intermediate frequency sound carrier at an amplitude less than the amplitude of said intermediate frequency picture carrier when said intermediate frequency carriers are located at desired positions on said response characteristic; a second detector means coupled to said intermediate frequency circuit means; said local oscillator being tuned at times to cause said intermediate frequency sound carrier to be transmitted by said intermediate frequency circuit means at an amplitude greater than the amplitude of said intermediate frequency picture carrier to cause said second detector means at such times to develop a first direct current output potential which is a function primarily of the average amplitude of said intermediate frequency sound carrier; and a control circuit coupled to said second detector and to said local oscillator, said control circuit comprising an electron discharge device having an output circuit including a rectifier, said electron discharge device being responsive to said first direct current output potential to develop in said output circuit a first control signal which is a function of the amplitude of said first direct current output potential, said control circuit also comprising means responsive to said first control signal for changing the tuning of said local oscillator to cause said intermediate frequency picture carrier to be transmitted by said intermediate frequency circuit means at an amplitude greater than the amplitude of said intermediate frequency sound carrier thereby causing said second detector means to develop a second direct current output potential which is a function primarily of the average amplitude of said intermediate frequency picture carrier and to develop an intercarrier sound signal having an amplitude varying as a function of the amplitudes of said intermediate frequency picture and sound carriers, said electron discharge device being responsive to said second direct current output potential to translate said intercarrier sound signal for rectification by said rectifier so as to develop in said output circuit a second control signal which is a function of the amplitudes of said second direct current output potential and said intercarrier sound signal, with said means for changing the tuning of said local oscillator responsive to said second control signal to cause said intermediate frequency picture and sound carriers to be located at said desired positions on the response characteristic of said intermediate frequency circuit means.

2. An intercarrier sound television receiver for utilizing a picture carrier of a first frequency amplitude modulated with video information and an associated sound carrier of a second frequency having a predetermined relation to said first frequency modulated with sound information, said receiver comprising: a first detector means including a tunable local oscillator for developing a separate intermediate frequency for each of said carriers; an intermediate frequency circuit means coupled to said first detector means of sufficient bandpass to transmit said two intermediate frequency carriers and having a response characteristic so as to transmit said intermediate frequency sound carrier at an amplitude less than the amplitude of said intermediate frequency picture carrier when said intermediate frequency carriers are located at desired positions on said response characteristic; a second detector means coupled to said intermediate frequency circuit means; said local oscillator being tuned at times to cause said intermediate frequency sound carrier to be transmitted by said intermediate frequency circuit means at an amplitude greater than the amplitude of said intermediate frequency picture carrier to cause said second detector means at such times to develop a first direct current output potential which is a function primarily of the average amplitude of said intermediate frequency sound carrier; a control circuit means coupled to said second detector means and to said local oscillator, said control circuit means comprising an electron discharge device having an output circuit including a rectifier, said electron discharge device being responsive to said first direct current output potential to develop in said output circuit a first control signal which is a function of the amplitude of said first direct current output potential, said control circuit means also comprising means responsive to said first control signal for changing the tuning of said local oscillator to cause said intermediate frequency picture carrier to be transmitted by said intermediate frequency circuit means at an amplitude greater than the amplitude of said intermediate frequency sound carrier thereby causing said second detector means to develop a second direct current output potential which is a function primarily of the average amplitude of said intermediate frequency picture carrier and to develop an intercarrier sound signal having an amplitude varying as a function of the amplitudes of said intermediate frequency picture and sound carriers, said electron discharge device being responsive to said second direct current output potential to amplify said intercarrier sound signal, with said rectifier being operated to rectify said amplified intercarrier sound signal to develop in said output circuit a second control signal which is a composite function of the amplitudes of said second direct current output and said intercarrier sound signal, with said means for changing the tuning of said local oscillator being responsive to said second control signal to cause said intermediate frequency picture and sound carriers to be located at said desired positions on the response characteristic of said intermediate frequency circuit means.

3. An intercarrier sound television receiver for utilizing a picture carrier of a first frequency amplitude modulated with video information and an associated sound carrier of a second frequency having a predetermined relation to said first frequency and frequency modulated with sound information, said receiver comprising: a first detector means including a tunable local oscillator for developing a separate intermediate frequency for each of said carriers; an intermediate frequency circuit means coupled to said first detector means of sufficient bandpass to transmit said two intermediate frequency carriers and having a response characteristic to transmit said intermediate frequency sound carrier at an amplitude less than the amplitude of said intermediate frequency picture carrier when said intermediate frequency carriers are located at desired positions on said response characteristic; a second detector means coupled to said intermediate frequency circuit means; said local oscillator being tuned at times to cause said intermediate frequency sound carrier to be transmitted by said intermediate frequency circuit means at an amplitude greater than the amplitude of said intermediate frequency picture carrier to cause said second detector means at such times to develop a first direct current output potential which is a function primarily of the average amplitude of said intermediate frequency sound carrier; and an automatic frequency control circuit comprising an electron discharge device having an input circuit and an output circuit, a rectifier included in said output circuit, means coupling said second detector means to said input circuit for applying the direct current output potential of said second detector means to said input circuit, said first direct current output potential being of a value to cause said electron discharge device to be cut off so as to develop in said output circuit a first control potential, means responsive to said first control potential for changing the tuning of said local oscillator to cause said intermediate frequency picture carrier to be transmitted by said intermediate frequency circuit means at an amplitude greater than the amplitude of said intermediate frequency sound carrier thereby causing said second detector means to develop a second direct current output potential which is a function primarily of the average amplitude of said intermediate frequency picture carrier and also to develop an intercarrier sound signal having an amplitude varying as a function of the amplitudes of said intermediate frequency picture and sound carriers, means for applying said intercarrier sound signal to said input circuit, said second direct current output potential being of a value to cause said electron discharge device to conduct and translate said intercarrier sound signal for rectification by said rectifier so as to develop in said output circuit a second control potential which is a function of said second direct current output potential and said intercarrier sound signal, with said means for changing the tuning of said local oscillator being responsive to said second control potential to cause said intermediate frequency picture and sound carriers to be located at said desired positions on the response characteristic of said intermediate frequency circuit means.

4. In a television receiver for receiving a television signal band including an amplitude modulated picture carrier wave and a frequency modulated sound carrier wave spaced a substantially fixed frequency interval from the picture carrier, the combination of converter means to which said carrier waves are applied for producing separate intermediate frequency picture and sound carriers, intercarrier signal producing means for heterodyning said intermediate frequency carriers to produce an intercarrier signal of an amplitude corresponding to the amplitude of said sound carrier and having a frequency corresponding to said frequency interval, frequency selective amplifier means coupled between said converter means and said intercarrier signal producing means, said amplifier means having a frequency response characteristic such that the transmitted amplitude of said sound carrier will normally be less than the minimum amplitude level of the picture carrier at maximum modulation thereof and such that the amplitude of said sound carrier increases in response to increase in the frequency thereof and at times exceeds the amplitude of said picture carrier, means responsive to said carriers for deriving a first direct current potential having a magnitude related to the amplitude of the one of said carriers having the larger maximum amplitude, a direct coupled amplifier having a pair of input terminals and an output circuit and operative to translate alternating current signals and direct current signals, means for applying said first direct current potential to said input terminals, load means connected in said output circuit for producing a first direct current control signal varying as a function of said first direct current potential, means for applying said intercarrier signal to said input terminals, means connected to said output circuit for rectifying the amplified intercarrier signal to produce a second direct current control signal corresponding to the intercarrier signal amplitude, direct current responsive frequency control means coupled to said converter means, and means for additively applying said first and second direct current control signals to said frequency control means to control the frequencies of said picture and sound carriers.

References Cited in the file of this patent

UNITED STATES PATENTS

| | | |
|---|---|---|
| 2,270,023 | Ramsay | Jan. 13, 1942 |
| 2,481,902 | Bradley | Sept. 13, 1949 |
| 2,773,119 | Parker | Dec. 4, 1956 |
| 2,898,400 | Parmet | Aug. 4, 1959 |

FOREIGN PATENTS

| | | |
|---|---|---|
| 479,458 | Canada | Dec. 18, 1951 |